(12) United States Patent
Samartsev et al.

(10) Patent No.: US 10,367,327 B2
(45) Date of Patent: Jul. 30, 2019

(54) GIANT-CHIRP ALL-NORMAL-DISPERSION SUB-NANOSECOND FIBER OSCILLATOR

(71) Applicant: IPG PHOTONICS CORPORATION, Oxford, MA (US)

(72) Inventors: Igor Samartsev, Westborough, MA (US); Andrey Bordenyuk, Southborough, MA (US)

(73) Assignee: IPG PHOTONICS CORPORATION, Oxford, MA (US)

( * ) Notice: Subject to any disclaimer, the term of this patent is extended or adjusted under 35 U.S.C. 154(b) by 0 days.

(21) Appl. No.: 15/515,228

(22) PCT Filed: Sep. 29, 2015

(86) PCT No.: PCT/US2015/052893
§ 371 (c)(1),
(2) Date: Mar. 29, 2017

(87) PCT Pub. No.: WO2016/054009
PCT Pub. Date: Apr. 7, 2016

(65) Prior Publication Data
US 2017/0237223 A1    Aug. 17, 2017

Related U.S. Application Data

(60) Provisional application No. 62/057,615, filed on Sep. 30, 2014.

(51) Int. Cl.
*H01S 3/11* (2006.01)
*H01S 3/067* (2006.01)
(Continued)

(52) U.S. Cl.
CPC ........ *H01S 3/1112* (2013.01); *H01S 3/06712* (2013.01); *H01S 3/06725* (2013.01);
(Continued)

(58) Field of Classification Search
CPC ................ H01S 3/112–118; H01S 3/06791
See application file for complete search history.

(56) References Cited

U.S. PATENT DOCUMENTS

| 6,275,512 | B1 * | 8/2001 | Fermann | H01S 3/067 |
| | | | | 372/102 |
| 2005/0226278 | A1 * | 10/2005 | Gu | H01S 3/0057 |
| | | | | 372/6 |

(Continued)

*Primary Examiner* — Tod T Van Roy
(74) *Attorney, Agent, or Firm* — Yuri B. Kateshov, Esq.; Timothy J. King, Esq.

(57) ABSTRACT

A single mode fiber pulsed oscillator includes an all normal dispersion ring cavity provided with a mode-locking fiber loop component and a giant chirp generating fiber component. The mode-locking fiber loop component is configured with a hybrid of NOLM and NALM configurations which is operative to induce a first phase acquisition of a spectrally narrow pulse due to SPM. The giant chirp generating fiber loop component is configured to induce the additional phase acquisition to the pulse broadened in the mode-locking fiber component so as to generate a pulse with a giant chirp. The fiber loop components each include a fiber amplifier and a coil of fiber. The amplifiers each are configured with an active fiber provided with a core which supports multiple transverse mode in a range of wavelength except for the desired wavelength at which the core is configured to support a single fundamental mode.

7 Claims, 4 Drawing Sheets

(51) Int. Cl.
*H01S 3/08* (2006.01)
*H01S 3/094* (2006.01)
*H01S 3/16* (2006.01)

(52) U.S. Cl.
CPC ...... *H01S 3/06745* (2013.01); *H01S 3/06791* (2013.01); *H01S 3/08045* (2013.01); *H01S 3/094069* (2013.01); *H01S 3/1109* (2013.01); *H01S 3/094019* (2013.01); *H01S 3/1618* (2013.01)

(56) References Cited

U.S. PATENT DOCUMENTS

2012/0275474 A1* 11/2012 Aguergaray ........ H01S 3/06791 372/3
2017/0310068 A1* 10/2017 Aguergaray ........ H01S 3/06791

\* cited by examiner

Known Art

Known Art

Known Art

Known Art

Known Art

Known Art

Known Art

Known Art

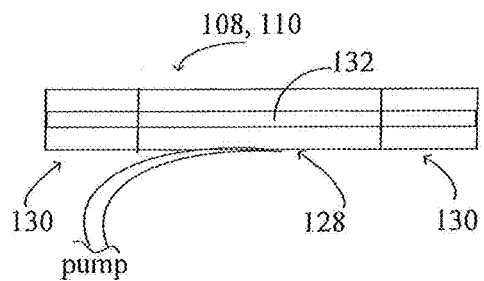
FIG. 8
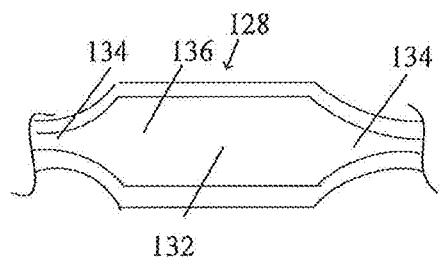
FIG. 9
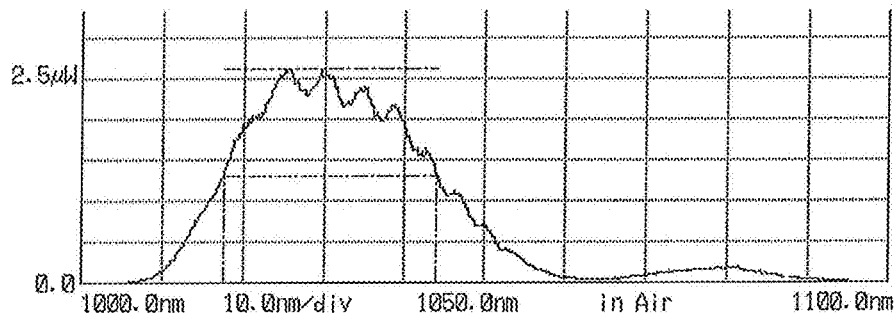
FIG. 10
FIG. 11
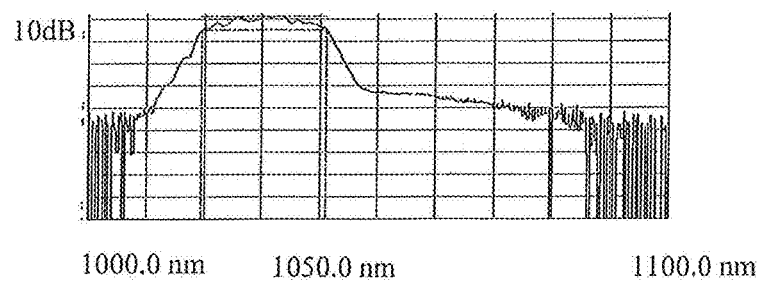

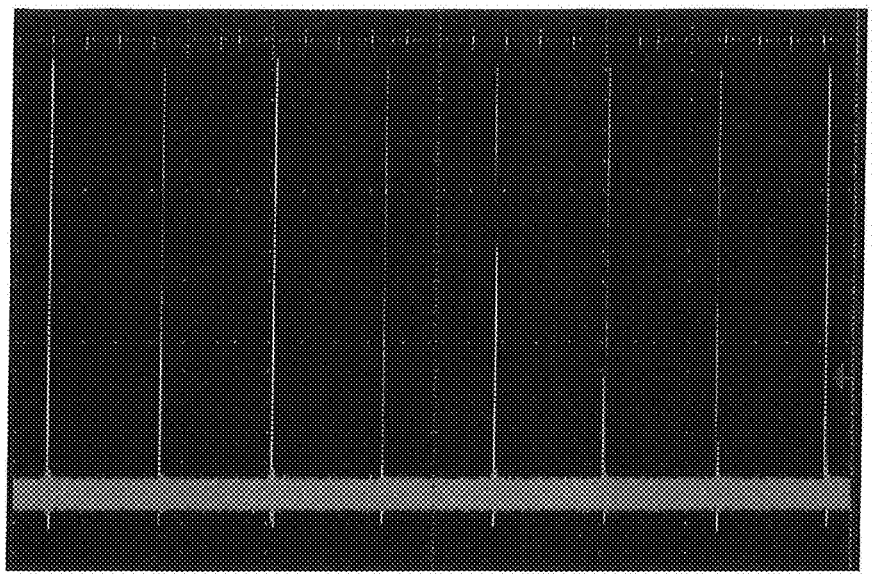
FIG. 12
FIG. 13
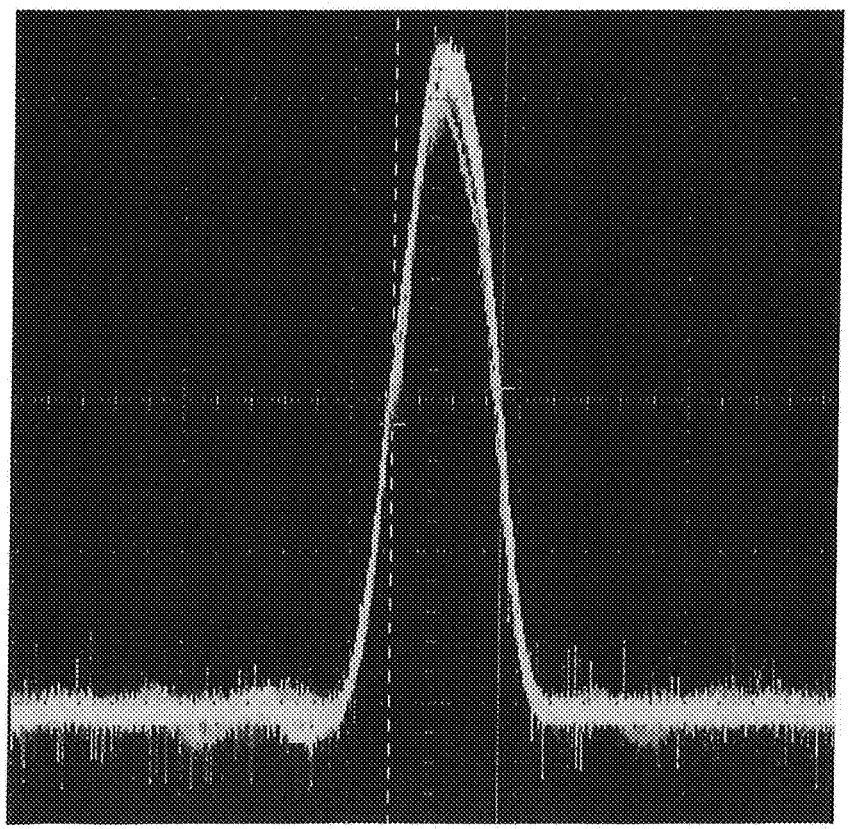

GIANT-CHIRP ALL-NORMAL-DISPERSION SUB-NANOSECOND FIBER OSCILLATOR

BACKGROUND OF THE DISCLOSURE

Field of the Invention

The invention relates to short pulse fiber ring laser systems. In particular, the invention relates to a modelocked all-normal-dispersion single mode fiber ring oscillator having an interferometric mode-locking architecture and configured to generate sub-nanosecond giant-chirped pulses in a 1 μm wavelength range.

Glossary

Anomalous dispersion of material refers to the material in which the refractive index increases with a gradually increasing wavelength.

Chirped pulse refers to the pulse in which the wavelength (frequency) changes across the pulse in time domain.

Dispersion refers to the dependence of the speed of light propagation in material (or the index of refraction) on the wavelength.

Fused Coupler refers to the fiber branching device used to distribute a power of optical signal in arbitrary proportions to multiple locations.

Interference refers to the result of vector interaction of waves impinging on one another, leading to the additive process where the amplitude of the two or more overlapping waves are systematically attenuated (distractive interference) or reinforced (constructive interference).

Isolator refers to the device allowing the transmission of light only in one direction.

Linearity, in common sense, refers to a mathematical relationship that can be graphically represented as a straight line, as in two quantities that are directly proportional to each other.

Linear frequency chirp refers to the pulse in which the frequency changes linearly across the pulse in time domain.

Nonlinearity is the interaction of light with matter in the regime where the response of the material to the applied electromagnetic field is nonlinear in the amplitude of this field.

Nonlinear phase acquisition refers to a gain of phase over the electric field; one of the manifestation of the nonlinear phase acquisition is broadening of a spectral component of light pulse due to Self-Phase modulation nonlinear phenomenon.

Nonlinear amplification loop mirror (NALM) is referred to the Sagnac interferometer constructed from a fused symmetric-split fiber coupler, whose output ports are spliced to respective input and output of an in-line amplifier form a loop with the amplifier being closer to either one of the coupler's output ports. In operation, the coupler splits the incoming signal into two replicas thereof which, after counter-propagating over the loop, interfere with one another in the coupler.

Nonlinear optical mirror (NOLM) is referred to the Sagnac interferometer constructed from a fused asymmetric-split fiber coupler, i.e., the coupler configured to split power in arbitrary portions.

Normal (positive) dispersion of material refers to the material in which the refractive index decreases with a gradually increasing wavelength.

Optical path is the product of geometrical path and a refractive index.

Periodicity (Boundary) condition of the oscillator is the repeatability of pulse parameters after each single pass over the ring-cavity.

Phase is the fraction of the wave cycle which has elapsed relative to the origin.

Phase shift refers to two multiple identical waves that do not line up. Phase shift may be caused by a difference in optical paths of respective identical waves.

Polarization refers to a state in which rays of light exhibit different properties in different directions. In other words, the polarization is a direction of electric field oscillation.

Polarizing beam splitter is the device that splits arbitrarily polarized beams into two orthogonal, linearly polarized components.

Pulse duration $\tau_p$ is the width of the time interval within which the power is at least half the peak power (FWHM). Ultra-short pulses are pulses in picosecond-femtosecond pulse duration range.

Pulse energy is the product of the peak power and pulse width, essentially the area under the pulse.

Ring Fiber oscillator refers to the fiber laser having a ring cavity.

Sagnac Interferometer refers to the fiber device in which incoming light goes through two coils of optical fiber so that in one fiber coil the light travels clockwise and in the other fiber coil travels counterclockwise. Rotation of the coils causes a phase shift in the combined output.

Spectral Domain is the characteristic of a light pulse describing a finite spectral width (bandwidth) even in the pulse with the instantaneous frequency being constant (i.e., pulse without chirp).

Self-phase modulation (SPM) is a phenomenon that results from the dependence of the refractive index of a medium on the intensity of a light pulse and is manifested by spectral and temporal broadening of the light pulse.

Self-similar pulse ("similariton") refers to the parabolic pulse that is capable of converting nonlinear phase into a linear frequency chirp.

Short pulse refers to the pulse having the duration in a sub-nanosecond range.

Soliton refers to the chirped pulse that preserves its temporal and spectral shape while propagating throughout a cavity.

Temporal domain is the characteristic of a light pulse related to an optical power P, i.e., energy per unit time that is appreciable only within short time interval and is close to zero at all other times.

WDM the device that joins or couples multiple signals of different wavelengths together.

Technological Landscape

Short-pulse fiber laser systems, offering innovative architectures and higher pulse peak intensity combined with high pulsing frequencies repetition rates, help manufacture components with unprecedented quality, accuracy and speed. Owing to the short duration of pulses, the laser energy can be input to the material in a shorter time than heat can be deposited which thus prevents thermal damage to the part. Not surprisingly, industrial sub-nanosecond laser systems find wide applications from the medical device market to many other major industries including electronics, semiconductor, automotive and microtechnology manufacturing, to name a few.

Since the discovery of the method for Q-switching of a laser cavity, which resulted in the increase in the peak output power by several orders of magnitude (giant pulse), another method for the generation of ultrashort laser pulses—modelocking (ML)—was discovered. The method is based on the generation of many longitudinal modes (frequencies) with definite specifically-locked phase relations among them within the pulse duration.

Laser output occurs at a number of frequencies or longitudinal modes of the resonator. If there is no locked phase relationship between these modes, the various frequencies will interfere with one another, and the output will fluctuates over time. Hence the mode locking is a method of locking the relative phases of these modes forcing the laser to emit a train of short light pulses. The larger the band of frequencies over which the laser oscillates, the shorter the duration of the mode locked pulses that can be produced. Mode locking methods can be divided into two classes: active and passive.

In active modelocking, a modulating element placed within the resonator is driven by an external power. The modulator can be pictured as a shutter that periodically opens and closes. When the modulation frequency is correctly adjusted, the shutter period is exactly synchronized to the resonator round trip time.

A periodic train of ultrashort pulses can appear in the absence of a light modulator. Because no modulation is required, this technique is called passive mode locking. Due to the possibility of forming pulses even shorter than those produced by active modelocking, passive mode locking is of particular interest here.

For giant chirped pulse mode, two steps are important for establishing a passive mode locking regime of a short pulse oscillator: (a) filtering out a spectrally narrow pulse from a broader pulse, and (b) broadening the formed narrow pulse both in frequency and time domain due to nonlinear effects affecting light in a long fiber. The result of these two steps is a linear positively chirped pulse, i.e., the pulse which is broadened in both spectral and temporal domains when compared to the initial pulse, and has a carrying frequency linearly varying across the pulse, as shown in FIGS. 1A-1B and 2A-2B, respectively. Ideally, the resulted chirped pulse has a relatively low peak intensity because otherwise peak intensities that can be obtained in a subsequent fiber amplifier may be too high and therefore potentially detrimental to the integrity of the amplifier.

The chirped pulse mode eliminates need for using materials with anomalous dispersion that are poorly suitable for a laser operation in a 1 µm wavelength range and allow the use of materials with normal dispersion in the desired wavelength range which is highly desirable for a variety of industrial applications.

The most commonly used architectures carrying output passive modelocking include saturable absorbers, non-linear polarization rotation (NLPR) and interferometric structure all deeply rooted in nonlinear optics and explained by various nonlinear effects.

The earliest architecture uses a real absorber, in the form of semiconductor saturable abosrber or mirror (SESAM) which is a device that reduces losses with increasing intensity of radiation propagating through it. The SESAM is configured as a multilayer structure typically placed inside the resonant cavity. Limitations of SESAM lie in its damage threshold, particularly in a 1 µm wavelength range, and the shortest possible pulse length due to dispersion. Also, a SESAM may be unreliable due the poor chirp-to-chip reproducibility, and manufacturing defects that can be identified only after it is placed within the resonant cavity.

The other two architectures NLPR and interferometric are both associated with a fiber laser provided with the ring resonator. In particular, these architectures are operate to create conditions favorable for acquisition of narrow pulse width due to self-phase modulation (SPM) nonlinear effect.

SPM arises due to intensity I dependence of refractive index n. As known, the refractive index is given by $$n = n_0 + n_2 I(t), I \sim E^2$$

where the first component $n_0$ is linear and the second component $n_2$ is nonlinear. Variations in signal intensity I cause a change in phase $\varphi$ of the signal which causes frequency chirping (spectral broadening). The phase $\varphi$ introduced by electric field over a fiber length L is given by $$\varphi = (2\pi/\lambda) nL \text{ or } 2\pi/\lambda (n_0 + n_2 I) L$$

where $\lambda$ is wavelength of optical pulse propagating in fiber of refractive index n, and nL is optical path length. Also, since intensity I is time dependent, i.e., the wave is temporally modulated, then phase $\varphi$ is also time dependent and changes across the chirped pulse. Thus, the phase modulation causes changes in spectrum in the spectral domain and pulse shape in the time domain. Particularly, a high intensity pulse propagating through a dispersive medium broadens in both time and spectral domains as shown in FIGS. 1A, B and 2A, B respectively. Under certain conditions the phase changes linearly across the pulse. This effect allows most effective compression of chirped light pulses down to transform limited which is necessary to obtain ultra-high peak powers of up to a megawatt level.

The NLPR can be understood using the simplified ring cavity of FIG. 3. The polarizing isolator 10 placed between two polarization controllers 12 and 14, respectively, acts as the mode-locking element and plays a double role of an isolator and a polarizer such that light leaving isolator 10 is linearly polarized. Then the linearly polarized light is coupled into controller 12 which converts linear polarization state into elliptical state having, by definition, long major and short minor axes. Based on the light intensity/polarization dependence, the peak intensity along the major long axis is higher than that along the minor short axis. In fact, so much higher that, as the pulse propagates further along the fiber, this high intensity is sufficient to generate nonlinear response in the fiber. In contrast, the intensity along the minor axis is insufficient to generate such an effect.

In one of the known embodiments, the polarization state evolves nonlinearly because of SPM (and other nonlinear effects) phase-shifts imposed on orthogonally polarized components. The state of polarization varies across the pulse because of the intensity dependence of the nonlinear shift. The polarization controller 14 is operative to force the polarization to be linear again in the central, high intensity part of the pulse which broadens spectrally as it is guided towards isolator 10. The latter lets the central or peak intense part pass, but blocks (absorbs) the low-intensity pulse wings. The net result is the pulse is shortened after a round trip inside the ring cavity, an effect identical to that produced by a fast saturable absorber. In other words, the polarization-dependent isolator, working together with rotating polarization, can generate the intensity-dependent loss. A variety of ultra-high-energy pulses can be successfully generated by using NLPR architecture including solitons, gain-guided solitons usually with cavity dispersion purely normal, and similaritons. However, the polarizing controllers require complicated feedback with fine control system. The NLPR process is sensitive to environmental changes and packaging conditions. As a consequence, it is difficult to satisfy periodicity conditions, i.e., reproducibility of pulse characteristics at a consistent location after each round trip of the laser cavity.

The interferometric fiber architecture has not been explored in such details as NLPR. There are two general types of interferometric architecture: the nonlinear optical loop mirror (NOLM) shown in FIG. 4A and the nonlinear amplification loop mirror (NALM) seen in FIG. 4B. Both of these devices operate on the same general principle: Sagnac interferometer. The latter is constructed from a fused fiber coupler 16 whose output ports 18 and 20, respectively, are spliced together to form a loop and the counter-propagating intensities Ic (clockwise) and Icc (counterclockwise) are made unequal either by the coupler splitting not equal 50% (NOLM) or by the inclusion of an in-line fiber amplifier 18 closer to one of the ports of the coupler (NALM).

As discussed above, the optical replicas with unequal intensities acquire a differential phase shift, due to the nonlinear refractive index. For example, in FIG. 4A, the coupler splits light intensity of the signal between (50−n) % (Icc) carried in the counterclockwise propagating replica with intensity Icc and (50+n) % (Ic) in the clockwise replica. Thus if Ic of the clockwise replica is sufficiently intense to trigger a nonlinear response of the fiber, i.e., to induce SPM, and Icc of the other replica is low, a significant differential phase shift will accumulate between the counter-propagating replicas. Propagating through fused coupler, the replicas interfere with one another as explained hereinbelow.

The signal guided along a first fiber is delivered to the coupler in which one of the signal's replicas Icc is coupled into a second fiber adjacent to the first fiber. The coupled replica acquires a pi/2 phase shift compared to the other replica Ic which remains guided along the first fiber. After passing through a fiber loop, the one replica Icc is coupled back into the first fiber and has a delay of pi compared to the other replica. Now these two replicas have respective fractions with matching phases and non-matching phases in the first fiber. The phase matching fractions destructively interfere with one another. Only fractions of replicas gaining non-matching phases, which correspond to high intensity pulse tips, constructively interfere as a result of SPM process during their propagation over the loop thus forming known a NALM. This principle is at work in modelocking of the oscillator, as for example, disclosed in US 2012/0275474 (US '474) fully incorporated herein by reference and discussed immediately below.

FIG. 5 illustrates the oscillator of US '474 with all normal dispersion cavity including a filter 30 providing pulse temporal selection, i.e., cutting out a narrow segment from a pulse which is born from noise. The segment is then coupled into a mode-locking element 40 which is configured on the basis of Sagnac interferometer and has either a NOLM or NALM configuration. The latter mode locks the oscillator generating chirped pulses of light with high intensity that further propagate through a fiber amplifier 50 before being coupled out of the cavity and compressed.

With the very limited experience operating lasers, which are configured in accordance with interferometric modelocking architectures, it is difficult to talk about advantages or disadvantages of this particular approach. Hence those, involved in the development of NOLM/NALM architecture, design laser configurations that seem to be most efficient based on a readily available technological base. For example, the US '347 discloses diode laser pumped fiber amplifier 50 configured with a single mode active fiber. Such a configuration requires the presence of a wavelength division multiplexer (WDM). Typically, at high energies, the operation of WDM is rather unpredictable which may result in unstable, non-uniform pulses.

A need therefore exists for a single transverse mode fiber oscillator provided with all normal-dispersion ring cavity which is configured to generate stable, uniform and high energy sub-nanosecond pulses of light in a 1 micron wavelength range.

SUMMARY OF THE DISCLOSURE

The disclosed all normal dispersion pulsed fiber oscillator operates in a 1 micron wavelength range. The oscillator has the 8-shaped ring resonator configured with a pulse forming fiber loop component and an interferometric mode-locking fiber loop component which allows a noise spike of CW radiation to evolve into a pulse. When the peak intensity of the pulse reaches high enough level to induce SPM, the pulse spreads out in both spectral and temporal domains forming a chirp.

To acquire the desired level of the peak intensity, the pulse is amplified by two Yb doped amplifiers each having an active fiber and two single mode (SM) flanking the active fiber. In contrast to many known configurations, the active fibers each are a multimode fiber which has a core that supports multiple transverse modes but is configured to support only a fundamental mode at the desired wavelength. The fundamental mode, as understood here, includes more than 96% of the overall power. The core of the active fiber is further configured so that a mode field diameter (MFD) of the fundamental mode matches that of the output SM fiber which considerably minimizes power losses.

Since the intensity of the pulse reaches the desired level sufficient to trigger SPM resulting in phase acquisition at a certain point of circulation, all energy pumped in the pulse works for its spectral and temporal expansion. As a result, a spectrally broad and long duration linearly-chirped pulse is generated.

The multimode active fiber allows avoiding the use of WDM which is necessary for the configuration based on single mode active fibers. Accordingly, higher pump powers can be coupled into both amplifiers by means of a side pumping configuration without the use of WDM which may limit pump powers and limit the spectral and temporal expansion of the pulse.

BRIEF DESCRIPTION OF THE DRAWINGS

The features and advantages of the disclosed oscillator will become more readily apparent from the following specific description accompanied by the drawings, in which:

FIG. 8 illustrates a schematic of gain block incorporated in the disclosed laser of FIG. 6;

FIG. 9 illustrates a schematic of altered gain block in the laser of FIG. 6.

FIG. 10 illustrates an output spectrum obtained in one of the experimental devices configured in accordance with FIG. 6.

FIG. 11 illustrates another output spectrum in a different experimental device configured in accordance with FIG. 6.

FIG. 12 illustrates a pulse train with a uniform interval between stable pulses generated by the laser of FIG. 6.

FIG. 13 illustrates a giant chirped pulse generated by the disclosed laser of FIG. 6.

Throughout the drawings, similar components are denoted by identical reference numerals.

SPECIFIC DESCRIPTION

By way of introduction, the disclosed passively mode-locked oscillator is configured with a novel all normal dispersion interferometric architecture enabling a stable mode-locked operation which results in picosecond, self-similar parabolic pulses emitted in a 1 micron wavelength range and having an output pulse energy of up to tens of nano joules (nJ).

Figure 6:
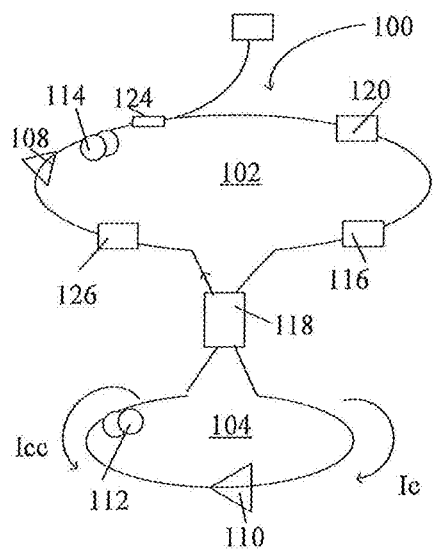
FIG. 6 illustrates a schematic of a passively mode-locked laser configured in accordance with the disclosure.

FIG. 6 illustrates the all-normal dispersion fiber oscillator 100 configured with an 8-shaped all fiber or integrated components laser ring cavity void of free space. The ring cavity includes a giant chirped pulse forming fiber loop component 102, an interferometric mode-locking fiber loop component 104, and a fused coupler 118 providing light communication between the fiber loop components. The mode-locking fiber loop component 104 is operative to convert continuous radiation to pulsed radiation so that a pulse acquires a first phase acquisition due SPM, whereas the pulse forming fiber loop component 102 is operative to provide the pulse broadened in the mode-locking component 104 with a greater phase acquisition so as to output a giant-chirp pulse.

The oscillator 100 is self-starting and operates in the following manner. As fiber amplifiers 108 and 110 of respective components 102 and 104 are turned on, a random signal-white noise present in the fiber components is amplitude a certain point of time, a first beat notch or spike with a relatively high amplitude builds up its intensity over multiple round-trips around the ring cavity while slightly spectrally broadening. The rest of the spectrum undergoes certain amplification, but compared to the amplification of the spike, it is insignificant. Every round trip the spike is further amplified and spectrally and temporally broadened. At a certain point of time, the intensity of the spike is amplified to the desired peak level capable of inducing SPM in mode-locking loop component 104 configured with a fused couple 118, first fiber amplifier 110 and a fiber coil 112.

The operation of any oscillator is subject to a periodic boundary condition including the substantial uniformity of the pulse temporal and spectral shapes. To meet this condition, the broadened spike is processed in a pulse-forming dissipative component 116 once a spectral linewidth of the spike approaches that one of pulse forming component 116 of pulse forming fiber loop component 102 which may be configured as an inline filter or an off-line circulator with fiber Bragg gratings. The pulse-forming component 116 cuts out a segment out of the broadened spike to form a pulse with a narrow spectral line and also reduces the duration of the spike. The spectral and temporal shapes of thus formed pulse may mimic those of the initial spike.

Figure 1A:
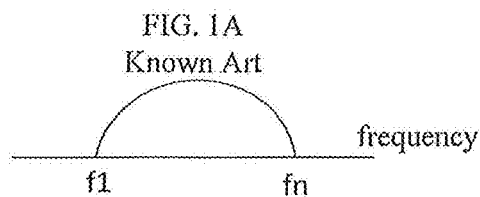
FIGS. 1A and 1B illustrate broadening of a linear chirped pulse in spectral domain due SPM in material with normal dispersion.
Figure 2A:
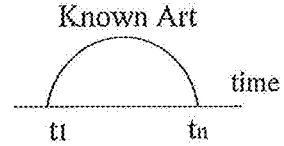
FIGS. 2A and 2B illustrate broadening of a chirped pulse in time domain due SPM in material with normal dispersion.
Figure 1B:
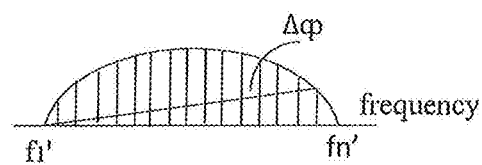
Figure 2B:
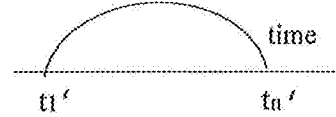
Figure 3:
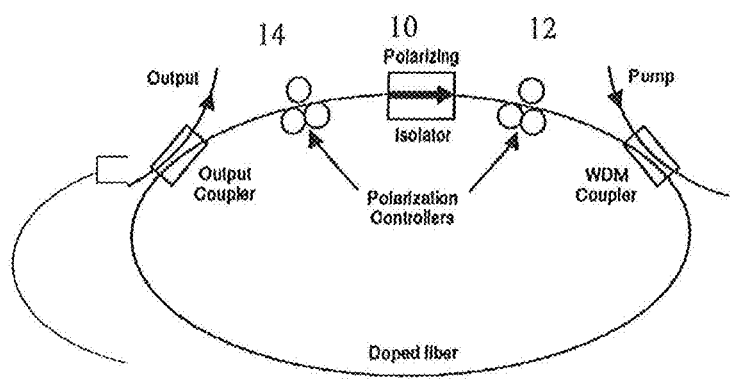
FIG. 3 illustrates an exemplary schematic of passively mode-locked fiber laser through nonlinear polarization rotation.
Figure 4A:
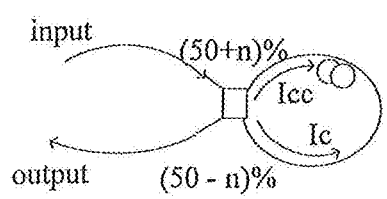
FIG. 4A illustrates an exemplary schematic of the NOLM.
Figure 4B:
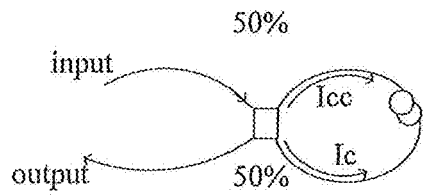
FIG. 4B illustrates an exemplary schematic of the NALM.
Figure 5:
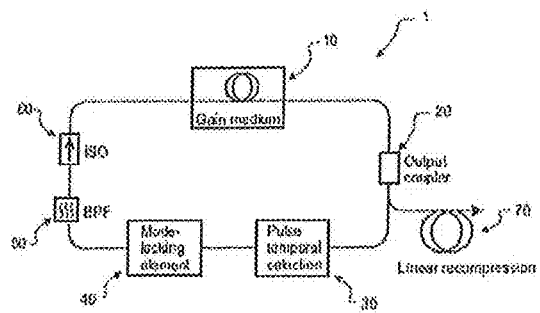
FIG. 5 illustrates an exemplary schematic of known passively mode-locked fiber laser through NOLM/NALM architecture.

This circulation around the ring cavity continues with the intensity of the pulse gradually increasing to the peak intensity which is sufficient to trigger nonlinear processes in first fiber coil 112, such as SPM, of mode-locking fiber loop component 104 providing the pulse with a phase acquisition. In other words, the pulse starts acquiring additional spectral components or modes in opposite increasing and decreasing wavelength directions in fiber coil 112 upon amplification in amplifier 110. This leads to a first spectral and temporal broadening of the pulse with consecutive longitudinal modes being delayed in time relative to one another in such a manner that a phase changes linearly across the pulse. The result of the above disclosed mechanism is the formation of the linear chirp shown in FIG. 1B having its peak intensity being now stabilized, i.e., while the pulse keeps propagating further through giant chirped forming fiber component 102 where it propagates through fiber amplifier 108 and second fiber coil 114. The second amplification and broadening provides the pulse with a phase acquisition greater than that acquired in mode-locking fiber component 104. The pulse further propagates along fiber component 102 through pulse-shaping element 116 where its spectral and temporal width are reduced before it is guided again through mode-locking component 104 where its peak intensity remains either the same or slightly lowers. From this point on, all the energy pumped in the pulse as it propagates through amplifiers 110 and 108 is redistributed among the longitudinal mode to broaden the pulse in both spectral and temporal domains. Thus, oscillator 100 moves from brief CW regime to a self-starting mode-locked regime.

Turning specifically to mode-locking component 104, upon coupling into coupler 118, the high intensity, spectrally and temporally shortened pulse is split in propagating and counter-propagating directions Ic and Icc respectively. The latter has an interferometric architecture and may be configured as a NOLM, NALM or a hybrid of these, i.e., a combination of an asymmetric coupler and amplifier, with the latter being shown in FIG. 6

Figure 7:
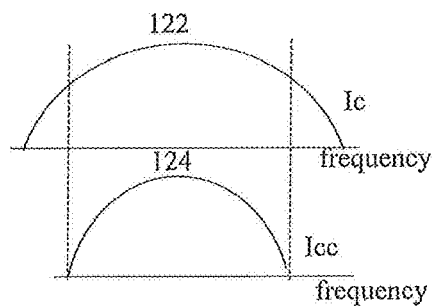
FIG. 7 illustrates the operation of the fused coupler incorporated in the mode-locking component of the disclosed oscillator.

Referring to FIG. 7 in addition to FIG. 6, the configuration of mode-locking component 104 is operative to provide the pulses propagating in respective opposite directions with different amplitudes since the interferometric architecture requires that the signals propagate along respective different optical paths, which in turns requires different peak intensities. In light of this requirement, the physical path between asymmetric coupler 118 and amplifier 110 of the counter-clockwise propagating signal Icc (FIG. 6) is longer than the path between the coupler and amplifier of the clockwise propagating signal Ic because of coil 112. Accordingly, the clockwise propagating pulse replica Ic is coupled into amplifier 110 first with the intensity thereof being increased in the amplifier so that, while it further propagates through coil 112, this pulse has a first phase acquisition.

On the other hand, counterclockwise propagating pulse replica Icc is guided through coil 112 with a relatively low intensity since it has not been yet amplified, and therefore its intensity is lower than that of the clockwise propagating replica Ic. Consequently, its phase acquisition within coil 112 is smaller than that of the clockwise pulse replica Ic because, as discussed above in detail, it is the intensity magnitude that defines the phase acquisition. After counter-clockwise pulse replica Icc is amplified in amplifier 110, it is coupled into coupler 118 with the amplitude practically matching that of the clockwise propagating pulse, but its phase is different. The replicas Ic and Icc further propagate through fused coupler 118 where they have respective overlapping spectral zones 122 and 125 (FIG. 7) which constructively or distractively interfere with one another depending on the phase. As a result, high intensity light having a substantially parabolic spectrum is further transmitted through coupler 118 in a clockwise direction (circular directions are exemplary) along chirp generating fiber component 102. There the pulse replica undergoes a much greater broadening in both domains than that in mode-locking component 104 than in component 102 and is finally coupled out through an output coupler or beam splitter 124 with a giant chirp. The low intensity light replica Icc propagating along mode locking component 104 and coupler 118 in a counterclockwise propagating direction is reflected into component 102 in a direction opposite to that of high intensity pulse replica Ic, and its further propagation is prevented in isolator 120.

Referring to FIGS. 8 and 9, amplifiers 108 and 110 each include a combination of ytterbium (Yb) doped fiber 128 having its opposite ends which are spliced to respective input and output passive fibers 130. The Yb doped fiber has a core 132 capable of supporting multiple transverse modes (MM). However, at the wavelength of interest, for example 1.06 micron, core 132 is configured to support only one fundamental mode. This configuration is realized by doping MM core 132 with not light emitting dopants which provide this core with a mode field diameter (MFD) substantially matching that of single mode (SM) passive fibers 130. As a result, when SM light is coupled into MM core 132 of Y-doped fiber 128, it excites only a fundamental transverse mode which, as known to artisan, has close to Gaussian shape intensity profile similar to that of SM fibers. As a consequence, generated pulses emitted from oscillator 100 each carry a single mode radiation.

The MM fibers provide amplifiers with the opportunity to use a side pumping scheme which may have certain advantages over an end pumping scheme with necessarily in conjunction with the SM active fibers. First, the side-pumping scheme does not require the use of wavelength division multiplexer (WDM) that can tolerate only limited powers. As a consequence, the other advantage of the side pumping scheme is the possibility of generating pulses with powers higher than those of SM amplifiers.

FIG. 9 illustrates MM Yb-doped fiber 128 having a double bottleneck-shaped cross section. This modification provides a central enlarged core part 132 with a greater diameter than that of core ends 134. The core ends 134 are configured similar to the ends of FIG. 8 and each have an MFD matching that of SM passive fibers. Alternatively, as numerous experiments show, MM Yb-doped fiber 128 may have a uniformly dimensioned core.

Returning briefly to FIG. 6, oscillator 100 has an additional LP isolator 126 to prevent backreflection from amplifier 108 to amplifier 110. All of the components of oscillator 100 are operated with linearly polarized light. Due to its flexibility any of isotropic fibers can lose the desired polarization which inevitably would lead to unstable pulses. To prevent it, all of the components of the disclosed ring cavity, including both isolators 120 and 126, are polarization maintaining. All fibers except Yb-doped fibers are SM PM fibers.

Preliminary experiments using oscillator 100 of FIG. 6 brought encouraging results. For example, FIG. 10 illustrates a smooth output spectrum. However, the output pulses in this experiment were rather energy unstable. FIG. 11, in contrast, shows ripples in the output spectrum, but the pulse energy is stable. The drawbacks shown in respective FIGS. 10 and 11 can be easily fixed with better manufactured components. FIG. 12 illustrates a pulse train with a uniform interval between stable pulses. Finally, FIG. 13 illustrates a giant chirped pulse having a 12 ps duration at half the maximum peak which is about 2 kW. Further preliminary experiments with giant chirped pulses showed excellent compression to a pulse duration below 200 fs.

All the features disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features. Any feature, whether preferred or not, may be combined with any other feature, whether preferred or not.

The invention claimed is:

1. An all normal dispersion self-starting single mode (SM) pulsed fiber oscillator, comprising:
   an 8-shaped resonant ring cavity provided with:
      a mode-locking fiber loop component configured to provide a pulse with a first phase acquisition due to a Self-Phase Modulation (SPM) phenomenon, the mode locking fiber loop component including a Polarization maintaining linearly polarized (LP) fused fiber coupler, a first fiber amplifier of the mode locking fiber loop component located asymmetrically relative to the LP fiber coupler, and a first coil of SM passive fiber located between an output of the first fiber amplifier and the fiber coupler, and
      a giant chirp generating fiber loop component coupled to the LP fused fiber coupler to receive the pulse with the first phase acquisition and configured to provide the pulse with a second phase acquisition due to the SPM phenomenon, wherein the second phase acquisition is so greater than the first phase acquisition that the giant chirp generating fiber component outputs the pulse with a giant chirp, the giant chirp generating fiber components including a second fiber amplifier, the first and second fiber amplifiers each being side-pumped and having:
         an active fiber with a multimode (MM) core having a double bottle-neck shaped cross-section which has spaced apart relatively small-diameter ends flanking a relatively large diameter central portion, wherein the MM core is configured to support propagation of a single fundamental mode at a desired wavelength in a 1 micron wavelength range; and
         input and output single mode (SM) fibers spliced to respective ends of the active fiber and having respective SM cores, the SM cores each having a mode field diameter (MFD) which matches a MFD of a fundamental mode supported by the MM core,
   wherein the SM pulsed fiber oscillator is configured without a wavelength division multiplexer (WDM).

2. The SM fiber oscillator of claim 1, wherein the output coupler has an asymmetric structure so that the mode locking fiber loop component is configured as a hybrid of NOLM and NALM architectures.

3. The SM pulsed fiber oscillator of claim 1, wherein the giant chirp generating fiber component further includes a second coil of SM passive fiber coupled to an output of the second fiber amplifier and a first linear polarized isolator coupled between the fused coupler and an input of the second fiber amplifier and preventing coupling of radiation backreflected from the second fiber amplifier into the first fiber amplifier.

4. The SM pulsed fiber oscillator of claim 3, wherein the giant chirp generating fiber component further includes a second linearly polarized isolator coupled between an output of the second fiber amplifier and the fused coupler and operative to prevent coupling of radiation reflected from the fused coupler into the output of the second fiber amplifier.

5. The SM pulsed fiber oscillator of claim 4, wherein the giant chirp generating fiber component further includes an output coupler between the output of the second fiber amplifier and second linearly polarized isolator, the output coupler being a beam splitter.

6. The SM pulsed fiber oscillator of claim 1, wherein the giant chirp generating fiber component further includes a filter providing periodic narrowing of spectral and temporal shapes of the pulse.

7. The SM pulsed fiber oscillator of claim 1 further comprising a plurality of MM pumps coupled to respective active fibers to define a side pumping technique.

\* \* \* \* \*